United States Patent [19]

Rother

[11] 4,063,704
[45] Dec. 20, 1977

[54] FISHING ROD HOLDER

[76] Inventor: Warren F. Rother, 849 Delaware Ave., Buffalo, N.Y. 14209

[21] Appl. No.: 753,798

[22] Filed: Dec. 23, 1976

[51] Int. Cl.² ............................................. A01K 97/10
[52] U.S. Cl. .................................... 248/515; 248/176; 248/316 R; 211/60 R; 24/204; 24/262
[58] Field of Search ............ 248/514, 515, 534, 226.4, 248/54 R, 74 B, 74 PB, 103, 104, 106, 176, 316 R; 24/DIG. 18, 204, 262 R; 43/54.5 R; 211/60 R, 60 SK

[56] References Cited

U.S. PATENT DOCUMENTS

| 1,222,246 | 4/1917 | Schumacher | 248/103 |
| 1,552,535 | 9/1925 | Beerstecher | 248/534 |
| 2,502,684 | 4/1950 | Ward | 248/515 |
| 3,422,570 | 1/1969 | Vorst et al. | 24/262 |
| 3,503,101 | 3/1970 | Kolozsvary | 24/204 |
| 3,524,572 | 8/1970 | Hall | 211/60 R |
| 3,570,793 | 3/1971 | Shackel | 248/515 |
| 3,640,273 | 2/1972 | Ray | 24/204 |
| 3,708,141 | 1/1973 | Friedgen | 248/515 |

FOREIGN PATENT DOCUMENTS

| 1,390,477 | 1/1965 | France | 248/514 |
| 518,237 | 2/1931 | Germany | 248/514 |

Primary Examiner—Marion Parsons, Jr.
Attorney, Agent, or Firm—Sommer & Sommer

[57] ABSTRACT

A fishing rod holder is adapted to be mounted on a suitable object, such as a boat, to releasably hold any of a plurality of different types and sizes of fishing rods. The rod holder includes a vertically adjustable support adapted to be mounted on the object, and a concave cradle member pivotally mounted on the upper marginal end portion of the support. Two resilient members are mounted on the cradle member, and are adapted to be wrapped around or folded to engage proximate portions of the rod to be held. These resilient members are adapted to be held in their operative rod-embracing positions by a means of suitable fasteners.

8 Claims, 8 Drawing Figures

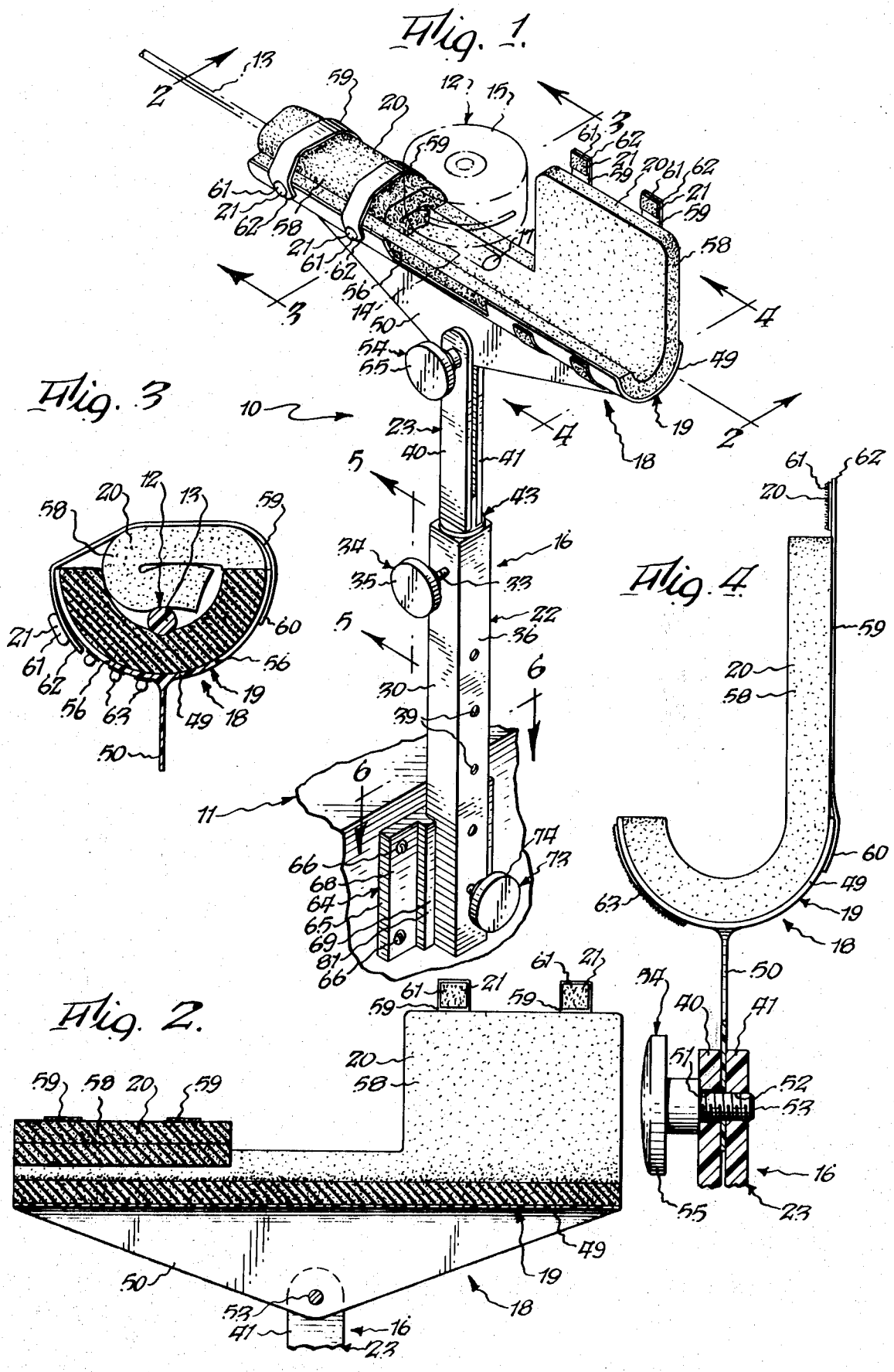

FISHING ROD HOLDER

BACKGROUND OF THE INVENTION

1. Field of the Invention

The present invention relates generally to the field of supports and holders for rod-like objects, and more particularly to an improved fishing rod holder which is adapted to securely hold, and permit quick release of, any of a plurality of different types of fishing rods.

2. Description of the Prior Art

Various types of fishing rod holders have been developed, and are known in the prior art.

Perhaps the most common of these is the tube-type rod holder wherein the butt end and handle portion of the rod is adapted to be inserted into the tube. While affording the desirable capability of quick release in the event of strike or snag, this tube-type of holder is substantially limited in use in that only those fishing rods with rearwardly-extending handle portions can be accommodated, and then only in a substantially upright position for fear of having the rod pulled out of the holder.

Some fishing enthusiasts prefer to use a live minnow and a fly rod, letting the tethered minnow swim freely. However, fly rods do not have handle portions extending rearwardly from the reel for a substantial distance toward the butt end of the rod. Hence, fly rods may not be held in the tube-type holders.

More recently, other types of rod holders have been developed. However, many of these are complicated in either structure or operation. Indeed, some of these do not contemplate quick release of the rod in the event of a strike. Examples of these other types of rod holders are shown in the following U.S. Pat. Nos.: 3,906,653; 3,792,829; and 3,484,066.

SUMMARY OF THE INVENTION

The present invention provides a unique holder which may be used to releasably hold any of a plurality of different types and sizes of fishing rods, in any of a plurality of positions. In addition to this feature of universal adaptability, the improved rod holder is adapted to hold a rod securely, and to permit quick release of the rod in the event of a strike or snag.

The inventive holder broadly includes support means adapted to be mounted on a suitable object, and cradle means mounted on the support means and adapted to releasably hold a fishing rod. The cradle means includes a cradle member, at least one resilient member mounted on the cradle member and adapted to embrace a portion of a rod, and at least one fastener associated with each resilient member and adapted to hold the associated resilient member in such rod-engaging position. In this manner, the holder may be used to releasably hold any of a plurality of different types of fishing rods and may readily permit removal of a held rod by selective disengagement of the fastener.

The rod holder preferably includes two of these resilient members. The support means may include a base member mounted on the object, and the cradle member is preferably pivotally mounted on the upper marginal end of the support means. Likewise, the support means should desirably be capable of vertical adjustment, and rotational movement about a vertical axis. In the preferred embodiment, the resilient member is a cellular latex foam material, similar to the foams used in mattresses, and the fastener is of the snap or hook and loop-type mounted on the end of a strap and engagable with a cooperative portion mounted on the cradle member.

Accordingly, one general object of the present invention is to provide an improved holder which is adapted to releasably hold any of a plurality of different types and sizes of fishing rods.

Another general object is to provide an improved rod holder which may be selectively adjusted to hold a fishing rod in any desired position.

Another object is to provide an improved fishing rod holder which will securely hold a fishing rod without scratching or maring, and yet afford the capability of quick selective release in the event of a strike or snag.

Still another object is to provide an improved fishing rod holder which is inexpensive to manufacture, which is highly effective for its intended purpose, and which is corrosion resistant.

These and other objects and advantages will become apparent from the foregoing and ongoing specification, the drawings, and the appended claims.

BRIEF DESCRIPTION OF THE DRAWINGS

FIG. 1 is a perspective view of the inventive holder, shown as being operatively mounted on an object and as having its forward resilient member releasably holding a fly rod, this view particularly showing the upper and lower support members, the cradle member, and the resilient members.

FIG. 2 is an enlarged fragmentary vertical sectional view thereof, taken generally on line 2—2 of FIG. 1, this view principally showing the cradle member and the resilient members in longitudinal cross-section.

FIG. 3 is an enlarged fragmentary transverse, vertical sectional view through the forward resilient member, taken generally on line 3—3 of FIG. 1, this view particularly showing the forward resilient member as arranged to embrace a proximate portion of the finishing rod.

FIG. 4 is an enlarged fragmentary transverse vertical sectional view thereof, taken generally on line 4—4 of FIG. 1, showing the cradle member, the rearward resilient member, and the rearward Velcro fasteners associated therewith.

DESCRIPTION OF THE PREFERRED EMBODIMENTS

Figure 5:
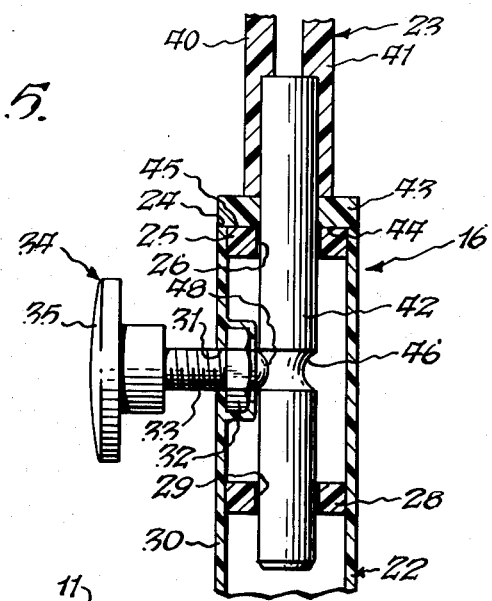
FIG. 5 is an enlarged fragmentary vertical sectional view, taken generally on line 5—5 of FIG. 1, this view particularly showing the rotatable connection between the upper and lower members of the support means.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, the present invention broadly provides an improved holder, of which one presently preferred embodiment is generally indicated at 10, which is adapted to be mounted on a suitable object, generally indicated at 11, and is adapted to releasably hold any of a plurality of different types of fishing rods or other rod-like members. In FIG. 1, the holder 10 is depicted as releasably holding a fly rod, generally indicated at 12, having a rod portion 13 extending leftwardly away from a handle portion 14, and having a reel 15 mounted on the rod proximate the butt end 17 of the handle portion. However, one unique feature of the inventive holder 10 resides in its ability to releasably hold any of a plurality of different fishing rod and reel combinations, such as the fly rod shown, a casting rod, an open or closed face spinning rod, and various other rod and reel combinations used for fresh or salt water fishing. Accordingly, as used herein, the term "fishing rod" is not limited to the fly rod shown in the drawings, but is intended in a broad generic sense to include other types of fishing rods or rod-like members as well.

This feature of universal adaptability to hold many different types of fishing rods readily distinguishes applicant's unique rod holder from the tube-type, known in the prior art, which depends upon the rod having a handle portion extending rearwardly of the reel for availability for insertion into a tubular member. While such known forms of tube-type rod holders are satisfactory in some situations, persons skilled in this art will readily appreciate that the tubular member must be substantially upright to prevent the rod from being pulled out of the tubular member in the event of a strike or snag. Hence, because of this limitation, the tube-type holder is not practical to hold a rod in a substantially horizontal position. Moreover, some fishing rods, such as the fly rod 12 shown, do not have a handle portion extending rearwardly of the reel, and therefore cannot be held by the tube-type holder.

Adverting now to FIG. 1, the inventive rod holder 10 is shown as including support means, generally indicated at 16, adapted to be suitably mounted on object 11, and cradle means, generally indicated at 18, mounted on the support means and adapted to releasably hold a rod-like member, such as fly rod 12. The cradle means 18 includes a cradle member, generally indicated at 19, at least one resilient member 20 mounted on the cradle member and adapted to be wrapped around or be folded to embrace a portion of rod 12, and at least one fastener 21 associated with each resilient member 20 and adapted to releasably maintain the associated resilient member in such rod-holding position. In this manner, the inventive rod holder 10 may be used to releasably hold any of a plurality of different types and sizes of fishing rods, and may readily permit quick removal of a held rod by selective disengagement of the fastener from the cradle member.

Figure 6:
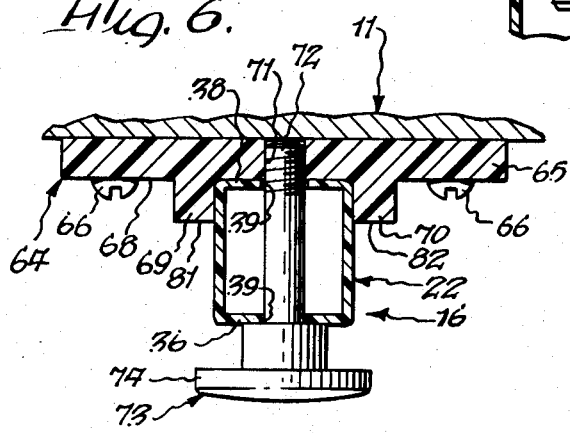
FIG. 6 is an enlarged fragmentary horizontal sectional view thereof, taken generally on line 6—6 of FIG. 1, showing a top plan view of the base member and a cross-sectional view of the lower support member.

Referring now principally to FIGS. 1, and 4–7, the support means 16 is shown as including an upright lower tubular member 22 having a substantially square cross-section (FIG. 6), and an upright upper member 23 configured substantially as a tuning fork. As best shown in FIG. 5, the lower tubular member 22 is depicted as having its open upper end 24 closed by a plug member 25 provided with a central vertical through hole 26. Another plug member 28 is mounted within the lower tubular member 22, and is also provided with a central vertical through hole 29 aligned with through-hole 26. These two plug members 25, 28 may be suitably secured within the lower tubular member 22 by a conventional bonding technique, or may be formed integrally with the lower tubular member, as desired. As best shown in FIG. 5, the left side 30 of tubular member 22 is provided with a horizontal through-hole 31. A nut 32 is shown as being suitably mounted within this tubular member 22 adjacent hole 31 to matingly receive the threaded shank portion 33 of a suitable fastener 34 having a rotatable handle portion 35, for a purpose hereinafter explained. Referring now to FIGS. 1 and 6, the front and rear surfaces 36, 38 of the lower tubular member 22 are shown as being further provided with a plurality of aligned vertically-spaced through holes, severally indicated at 39, for a purpose hereinafter explained.

As previously mentioned, the upper member 23 is configured substantially as a turning fork having a pair of transversely-spaced upwardly-extending left and right fork members 40, 41, a downwardly-extending rod-like member 42 (FIG. 5), and an intermediate horizontal washer-like member 43 having a lower horizontal annular planar surface 44 arranged to engage the upper horizontal annular planar surface 45 of plug member 25. As best shown in FIG. 5, the depending rod-like member 42 is arranged to penetrate the holes 26, 29 provided through the plug members 25, 28. The rod-like member 42 is also provided with an annular concave groove or recess 46 in which the convex nose 48 of fastener 34 may be received. Hence, the upper member 23 is mounted on the lower member 22 for rotational motion about the vertical axis of rod-like member 42. However, fastener 34 may be suitably tightened to lock the upper member 23 in a desired angular position relative to lower member 22.

Referring now to FIGS. 1, 2 and 4, the preferred embodiment of the cradle member 19 is depicted as having an upwardly-opening thin-walled semicircular shell 49, and a vertical plane member 50 depending therefrom and captured between the upper marginal end portions of fork members 40, 41. The left fork member 40 is shown provided with a horizontal through hole 51, and the right fork member 41 is provided with an aligned internally-threaded hole 52 adapted to matingly receive the threaded shank portion 53 of a suitable fastener 54 having a leftward handle portion 55. Hence, by suitably tightening fastener 54, the depending plate member 50 may be compressed between the upper marginal end portions of two forks 40, 41. Of course, the fastener 54 may be selectively loosened to permit the cradle member 19 to be rotated about a horizontal axis, and selectively tightened to hold the cradle member fast in a desired angular position. When viewed in left side elevation, the plate-like member 50 appears to have a triangular outline, and the semi-circular shell 49 may be provided with one or more intermediate rectangular notches 56 to accommodate the trigger portion of a casting rod, for example. Moreover, the shell 49 and plate-like member 50 may be formed separately and bonded together, or may be formed integrally, as desired.

In the preferred embodiment, the resilient member 20 is a single piece of a suitable latex cellular foam material, approximately one-half inch thick, configured to the shape of the shell 49 and having free portions 58 adapted to be wrapped around or folded to embrace a proximate portion of a fishing rod. A portion of this foam material is preferably bonded or adhesively secured within the shell 49. While use of a foam material is presently preferred, other types of spongy, pliable, or resilient materials may also be used. Hence, as used herein, the "resilient member" is intended to generically define a member formed of any resilient material which may be deformed to compress the rod when such material is wrapped therearound or folded to engage the rod.

In the preferred embodiment, two fasteners 21 are provided for each of the two resilient member portions, this being shown in FIG. 1. These fasteners 21 are severally shown as comprising a strap-like member 59 having one marginal end portion 60 secured to the cradle member shell 49 and carrying a suitable fastener portion 61 on its other marginal end portion 62 and engagable with any one of a plurality of cooperative fastener portions 63 mounted on the other side of the shell. In FIG. 1, the fasteners 21 associated with the left or forward resilient member 20 are shown as being of the snap type with one half being mounted on the strap and the other cooperative half being mounted on the cradle shell. To illustrate usage of an alternative fastener, the fasteners 21 associated with the rightward or rearward resilient member are illustrated as being formed of as hook and loop type fasteners, again with one half being mounted on the strap and the other cooperative portion being mounted on the cradle shell. Regardless of whether the snap or Velcro fasteners are used, the straps may be adjustably secured to the cradle shell to accommodate and securely hold different sizes and types of rods. While use of the snap fasteners affords the capability of incremental adjustment, use of as hook and loop type fasteners affords the additional capability of infinite adjustment of strap length.

If the inventive holder 10 is used to hold a fly rod, as shown, the reel 14 may be arranged in the notch between the forward and rearward resilient members, and the only forward resilient member is wrapped around the rod. However, if the holder 10 is used to hold a casting rod, for example, or any other type of rod having a rearwardly-extending handle portion, the reel may be again arranged in the notch, with the forward resilient member being wrapped around a portion of the rod ahead of the reel, and the rearward resilient member being wrapped around a rearward portion of the rod behind the reel. In either event, each resilient member is simply wrapped around or suitably folded to engage a portion of the rod, and is secured in this position by means of the fasteners 21.

The support means 16 may further include a base member, generally indicated at 64, mounted on the object and adapted to adjustably hold the support lower member 22.

Referring now to FIGS. 1 and 6, the first form of base member 64 is depicted as including a vertical plate-like member 65 having a plurality of horizontal mounting holes arranged to accommodate passage of a corresponding plurality of fasteners 66 by which the plate-like member may be secured to the object. The forward vertical planar rectangular surface 68 of plate-like member 65 is provided with a pair of laterally-spaced vertically-elongated left and right bosses 69, 70, respectively, which are adapted to restrain lateral movement of the support lower member 22. As best shown in FIG. 6, the plate-like base member 65 is further provided with an internally-threaded hole 71 to matingly receive the threaded shank portion 72 of a fastener 73 having a graspable handle portion 74. This fastener 73 may be arranged to penetrate any of aligned lower support member holes 39, 39, and may be threaded into base member hole 71 to afford the capability of adjusting the vertical height of the support means relative to the base member.

Figure 7:
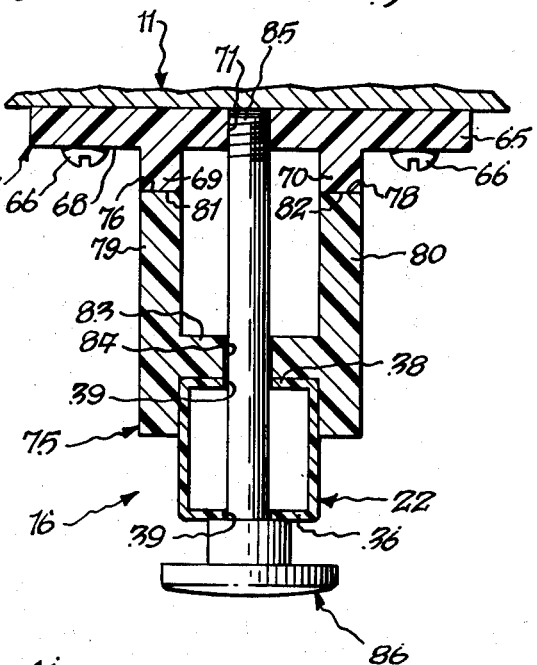
FIG. 7 is a view generally similar to FIG. 6, but showing an H-shaped spacing member interposed between the base member and the lower support member to space the support means further from the object.

The embodiment shown in FIG. 7 is similar to the embodiment shown in FIGS. 1 and 6, except that the lower support member 22 is spaced outwardly from the base member 64 by the presence of an intermediate H-shaped member, generally indicated at 75. This spacing member 75 has the rearward vertical surfaces 76, 78 of its left and right legs 79, 80 arranged to abut the forwardly-facing vertical surfaces 81, 82 of base member bosses 69, 70, respectively. The cross-piece 83 of member 75 is provided with a hole 84, and is arranged to be engaged by the rear surface 38 of the lower support member 22. As with the first embodiment previously described, the relatively long threaded shank portion 85 of a fastener 86 is arranged to penetrate holes 39, 39 and 84 to be matingly received in base member threaded hole 71. This second embodiment illustrated in FIG. 7 may be used to space the support means further away from the object upon which the base member 65 is mounted, should this be necessary.

Figure 8:
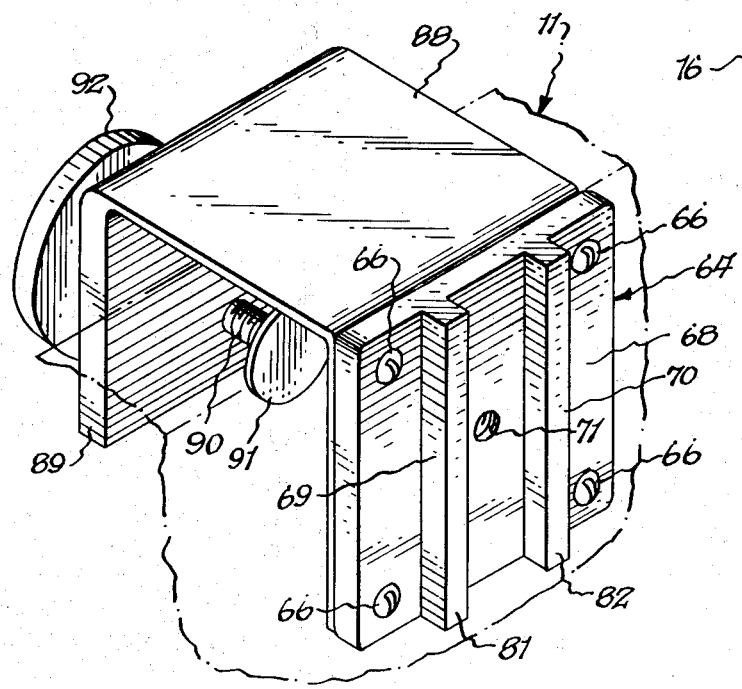
FIG. 8 is a perspective view of another embodiment wherein the base member is mounted on an inverted U-shaped clamp member.

The third embodiment of the base member is illustrated in FIG. 8. In this embodiment, the base member 65 is shown as being suitably secured to an inverted U-shaped member 88. The rearward depending vertical flange 89 of this U-shaped member 88 is provided with a tapped hole through which the threaded shank portion 90 of a clamp member is mounted. This clamp member is also provided with a foot 91 arranged to engage the object, and a graspable handle portion 92 which may be suitably rotated to tighten the base member to the object. This embodiment is particularly adapted to be secured to a portion of a small boat adjacent the gunwale.

Of course, persons skilled in this art will readily appreciate that various changes and modifications may be made. While the various parts and components of the inventive holder are preferably formed integrally of a suitable plastic, these parts and components may alternatively be formed of any suitable material. However, a plastic material is presently preferred because of the relative ease of forming the parts by an injection molding technique, and for its corrosion resistance. Similarly, while snap and Velcro fasteners have been illustrated and described as being used to hold the resilient material in its gathered or folded rod-embracing position, it will be appreciated that other types of fasteners may alternatively be used. Likewise, the resilient material need not be a foam material, but may be some other suitable resilient or deformable material. Also, other types of fasteners and connecting devices may be substituted for fasteners 35, 54 and 73 and 86, as desired.

Therefore, the present invention provides a unique fishing rod holder which will accommodate any of a plurality of different types of fishing rods. Moreover, the rod holder may be selectively adjusted to hold a fishing rod in virtually any position. In the event of a strike, the fisherman need only disconnect fasteners 21 to free the rod from the holder.

Accordingly, while several preferred embodiments of the inventive rod holder have been shown and described, persons skilled in this art will readily appreciate that various additional changes and modifications may be made without departing from the spirit of the invention which is defined by the following generic claims.

What is claimed is:

1. A holder adapted to be mounted on an object and adapted to releasably hold any of a plurality of different types of fishing rods, comprising:
   support means adapted to be mounted on said object; and
   cradle means mounted on said support means and adapted to releasably hold a fishing rod, said cradle means including a cradle member, a resilient member having one portion mounted on said cradle member and having two free portions adapted to be folded to embrace proximate portions of said fishing rod, and at least one fastener means associated with each resilient member free portion and arranged to selectively engage said cradle member and adapted to hold the associated resilient member free portion in such rod-engaging position;
   whereby said holder may be used to releasably hold any of a plurality of different types of fishing rods, and may readily permit removal of a rod by selective disengagement of said fastener member from said cradle member.

2. The holder as set forth in claim 1 wherein said cradle member is pivotally mounted on said support means.

3. The holder as set forth in claim 1 wherein said support means includes a base member adapted to be mounted on said object.

4. The holder as set forth in claim 1 wherein said support means includes an upper member and a lower tubular member, said upper member being received in said lower member, and means for holding said upper and lower portions together.

5. The holder as set forth in claim 1 wherein said resilient member is a foam material.

6. The holder as set forth in claim 1 wherein said fastener means is provided with a fastener portion engagable with a cooperative fastener portion provided on said cradle member.

7. The holder as set forth in claim 6 wherein said fastener means includes a snap-type fastener.

8. The holder as set forth in claim 6 wherein said fastener means includes a hook and loop-type fastener.

* * * * *